United States Patent [19]

Cordovi

[11] Patent Number: 4,914,369
[45] Date of Patent: Apr. 3, 1990

[54] DISC DRIVE WITH IMPROVED STORAGE CAPACITY

[76] Inventor: Nisso Cordovi, 1720 Lochmoor Blvd., Jackson, Mich. 49201

[21] Appl. No.: 267,018

[22] Filed: Nov. 4, 1988

[51] Int. Cl.$^4$ .............................................. H02P 8/00
[52] U.S. Cl. ................................ 318/696; 318/685; 360/39; 360/78.13
[58] Field of Search ............. 318/696, 685; 360/39, 360/78.13

[56] References Cited

U.S. PATENT DOCUMENTS

| | | | |
|---|---|---|---|
| 4,145,644 | 3/1979 | Liu | 318/696 |
| 4,459,527 | 7/1984 | Hayman | 318/696 |
| 4,622,603 | 11/1986 | Mizunuma | 318/78.13 |
| 4,631,466 | 12/1986 | Sherwin | 318/696 |
| 4,644,418 | 2/1987 | Banns et al. | 360/39 |

Primary Examiner—William M. Shoop, Jr.
Assistant Examiner—Saul M. Bergmann
Attorney, Agent, or Firm—Polster, Polster and Lucchesi

[57] ABSTRACT

A drive system for a double-sided floppy disc includes a head for each side of the disc, a stepper motor responsive to stepper motor control signals for moving the heads to predetermined tracks on the floppy disc, and a control circuit for generating the stepper motor control signals in response to commands from the computer. The tracks on the floppy disc are disposed with the first "n" tracks on one side of the floppy disc and the "N+1"st track and remaining tracks on the other side. The "n"th and "n+1"st tracks are disposed adjacent each other along a boundary of the disc but on opposite sides of the disc. The control circuit generates a first predetermined sequence of stepper motor control signals to move the first head in the direction from the preceding tracks toward the "n"th track and a second predetermined sequence of stepper motor control signals to move the second head in the direction from the "n+1"st track to succeeding tracks. The second predetermined sequence of stepper motor control signals is derived from the first predetermined sequence.

7 Claims, 3 Drawing Sheets

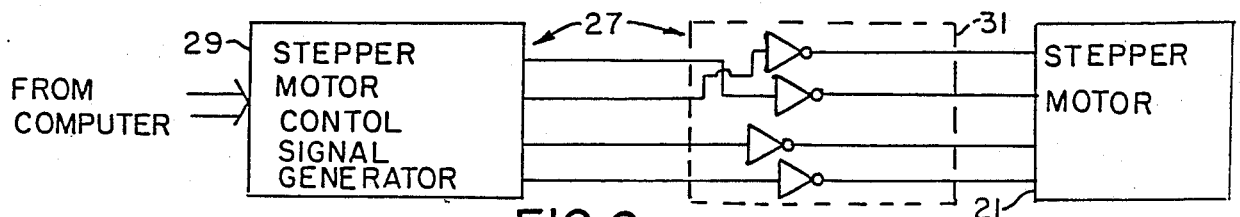
FIG. 6.
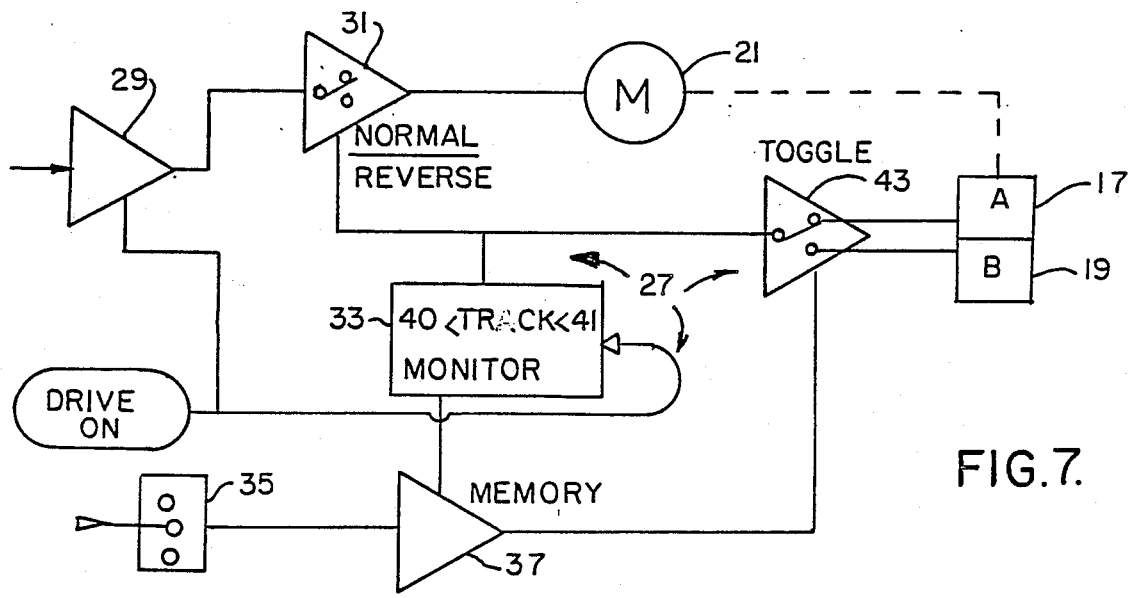
FIG. 7.
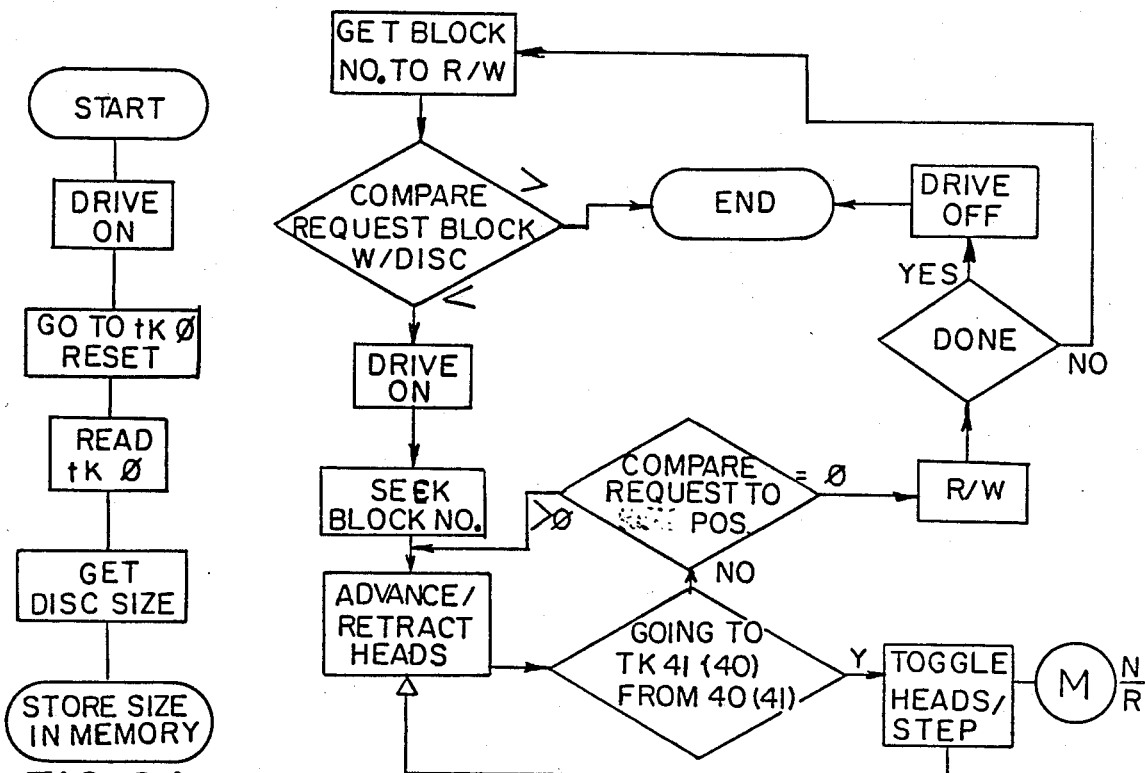
FIG. 9A.
FIG. 9B.

DISC DRIVE WITH IMPROVED STORAGE CAPACITY

BACKGROUND OF THE INVENTION

This invention relates to the control of disc drives, and more particularly to the control of disc drives for data recording media such as floppy discs.

The personal computer or microcomputer is widely used for a variety of applications in the home, business, school and industry. Programs and external data storage for these computers are generally encoded on a flexible disc, called a floppy disc. The data on these discs is stored on a plurality of concentric tracks, which are arbitrary divisions of the surface of the disc which the computer can recognize by various embedded codes after the disc is formatted.

A disc drive for a floppy disc, or a hard disc, includes a motor for rotating the disc, a read/write head (or heads) for transferring data to and from the disc, a stepper motor for moving the read/write heads along the surface of the disc, and circuitry for interfacing between the computer and the motors and heads of the disc drive.

The floppy disc, if it has recording medium on both sides, can have tracks on both sides. In that case, read/write heads for both sides are required.

Whether or not both sides of the floppy disc has tracks, the tracks are each numbered for identification purposes. Certain extended capacity discs are available for the Apple II (Reg. TM) computer in the standard five and one-quarter inch size. The track numbers for these discs alternate sides, so that track "1" is on one side of the disc, track "2" is on the opposite side of the disc, and so on.

By way of example, disc drives used with the Apple II (Reg. TM) series of microcomputers are available in three information storage capacities: (1) standard density, 5¼" mini-floppy disc, (2) high density, 3½" microfloppy disc, and (3) hard disc density. The formats and densities of these discs are all different and, therefore, incompatible because of mechanical differences. One or two specific interface boards may be required to make them useable by the computer, according to the type of drive.

Some of this incompatibility could be eliminated if a greater disc storage capacity could be offered on the 5¼" mini-floppy disc while retaining 100% compatibility with the existing drives. Of course, such incompatibility should not be eliminated at the added cost of additional computer hardware, special interface cards, or special software.

Earlier attempts to provide users with greater storage capacity were only partially successful because the drives required special interface cards, or unreliable software modifications, or special software. To add further complication, these earlier high-capacity drives would not read a standard disc, and discs created in these earlier high-capacity drives could not be read in standard drives.

SUMMARY OF THE INVENTION

Among the various objects and features of the present invention may be noted the provision of a drive system for a floppy disc with greatly improved storage capacity and excellent compatibility with existing discs and drives.

Another object is the provision of such a system which is self-contained in that it does not require additional hardware, special interface cards in the computer, or additional software for the computer.

A further object is the provision of such a system with adheres completely to the circuitry, protocol and format of the standard drive so that its operation in the extended storage area is completely transparent to the computer.

A fourth object is the provision of such a system which eliminates software compatibility and portability problems.

A fifth object is the provision of such a system which is a pin-for-pin substitute for the standard drive, while providing greatly extended storage capability.

A sixth object is the provision of such a system which eliminates any hesitation in going from one side of the disc to the other.

A seventh object is the provision of such a system which allows a computer to store a portion of a file on one side of the floppy disc and continue it onto the other without any disruption of the processing of the information contained within that file.

Other objects and features will be in part apparent and in part pointed out hereinafter.

Briefly, in a first aspect of the present invention, a drive system is provided for a floppy disc having numbered data tracks on both sides, which data tracks are ordered in a predetermined sequence. The drive system includes a first head for transferring data between a personal computer or the like and one side of the floppy disc, and a second head for transferring data between the personal computer and the second side of the floppy disc. A stepper motor is responsive to stepper motor control signals for moving the first and second heads to predetermined tracks on the floppy disc, the stepper motor control signals determining the predetermined track to which the stepper motor moves the heads. A control circuit receives signals from the computer in a predetermined standard format defining the action desired by the computer and in response generates the stepper motor control signals. The tracks on the floppy disc are disposed with the first "n" tracks on one side of the floppy disc and the "n+1"st track and remaining tracks on the other side of the floppy disc. The "n"th and "n+1"st tracks are adjacent each other along a boundary of the disc but on opposite sides of the disc. The control circuit generates a first predetermined sequence of stepper motor control signals to move the first head in the direction from the preceding tracks toward the "n"th track and generates a second predetermined sequence of stepper motor control signals to move the second head in the direction from the "n+1"st track to succeeding tracks. The second predetermined sequence of stepper motor control signals is derived from the first predetermined sequence of signals.

In a second aspect, the drive system of the present invention includes a first head for transferring data between a personal computer or the like and one side of the floppy disc, a second head for transferring data between the personal computer and the second side of the floppy disc, and a stepper motor responsive to stepper motor control signals for moving the first and second heads to predetermined tracks on the floppy disc. A control circuit generates the stepper motor control signals in response to signals from the computer defining the action desired by the computer. The tracks on the floppy disc are disposed with the first "n" tracks on one side of the floppy disc and the "n+1"st track and remaining tracks on the other side of the floppy disc. The "n"th and "n+1"st tracks are disposed adjacent each other along a boundary of the disc but on opposite sides of the disc. The control circuit includes circuitry for generating a first predetermined sequence of stepper motor control signals when the computer requests movement from any one track to a higher track and for generating a second predetermined sequence of stepper motor control signals when the computer requests movement from any one track to a lower track. The control circuit further includes circuitry responsive to a transition from the "n"th track to the "+1"st track to accept the first predetermined sequence of stepper motor control signals and transform those signals into signals which cause movement of the stepper motor in the direction opposite that caused by the untransformed signals of the first predetermined sequence and to accept the second predetermined sequence of stepper motor control signals and transform those signals into signals which cause movement of the stepper motor in the direction opposite that caused by the untransformed signals of the second predetermined sequence.

BRIEF DESCRIPTION OF THE DRAWINGS

FIG. 6 is a view illustrating how the system of FIG. 4 operates when the second side of the disc is being read;

FIG. 7 is a block schematic of the drive system of the present invention;

FIGS. 9A and 9B are flowcharts governing the operation of the drive system of FIG. 7.

Similar reference characters indicate similar parts throughout the several views of the drawings.

DESCRIPTION OF THE PREFERRED EMBODIMENT

A drive system 11 of the present invention drives a floppy disc 13 so that information or data may be transferred between the disc and a computer such as an Apple II Series (Reg. TM) personal computer 15. The floppy disc has numbered data tracks on both sides, labelled A and B in FIG. 2. The data tracks are ordered in a predetermined sequence as follows: Side A includes the first "n" tracks and side B includes the second "n" tracks. For purposes of illustration, floppy disc 13 carries eighty tracks, the first forty being on side A and the second forty being on side B.

Figure 1:
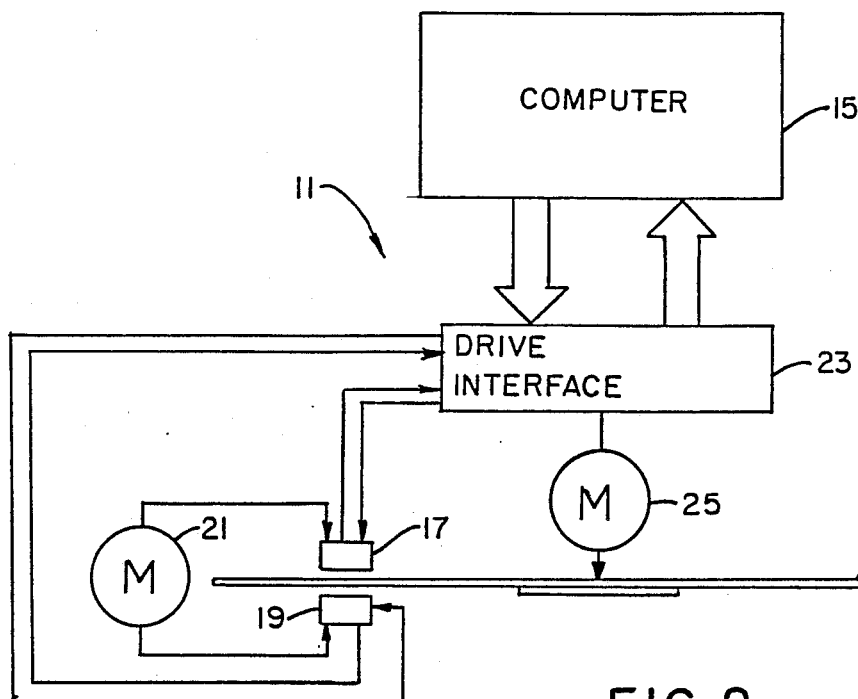
FIG. 1 is a block diagram illustrating the environment of the present invention.
Figure 2:
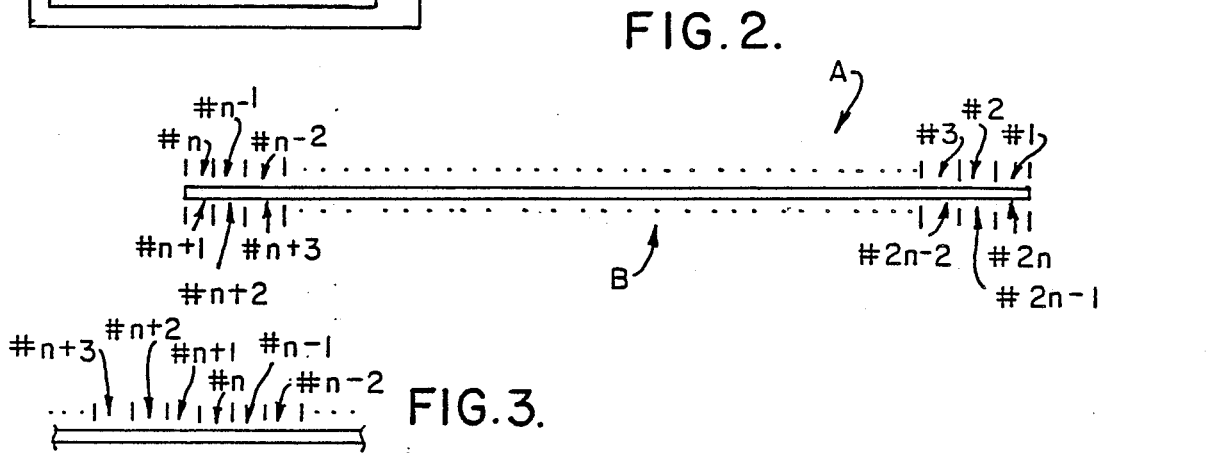
FIG. 2 is a front elevation of a portion of the floppy disc of the present invention illustrating the organization of the tracks on the disc.

FIG. 2 illustrates the more general case in which tracks 1 through "n" are disposed on side A and tracks "n+1" through "2n" are disposed on side B. It should be realized that the actual floppy disc may contain a track "0" with identifying information or the like and additional area with no tracks thereon. However, the data portions of disc 13 are arranged as shown For purposes of illustration, track "1" is disposed at the outermost portion of disc 13, while tracks "n" and "n+1" are disposed at the innermost portion of disc 13, although the order of the tracks could be reversed if desired.

The drive system includes a pair of read/write heads 17 and 19 by means of which information is transferred between computer 15 and floppy disc 13. First head 17 transfers data between computer 15 and side A of the floppy disc, while second head 19 transfers data between the personal computer and side B.

A stepper motor 21 is responsive to stepper motor control signals for moving the first and second heads to predetermined tracks on the floppy disc. Stepper motor 21 and heads 17 and 19 are conventional in construction.

The present invention, like other disc drives, includes a drive interface circuit 23 for interfacing between the computer and the drive hardware. In addition to the heads and the stepper motor, that hardware includes a second motor 25 for rotating disc 13 in the conventional manner. Computer 15 sends commands in a predetermined standard format to interface 23 which the interface then interprets and, in response, orders the necessary operations of the drive system hardware. Such computer commands include reading data from predetermined tracks of the disc and writing data to the disc.

As mentioned above, the tracks on disc 13 are disposed with the first "n" tracks on one side of the floppy disc and the "n+1"st track and remaining tracks on the other side of the floppy disc. The "n"th and "n+1"st tracks are disposed adjacent each other along a boundary of the disc (which boundary may just be the outer limit of the portion of the disc used for data). The "n"th and "n+1"st tracks (in this case the 40th and 41st tracks) are, therefore, adjacent each other but on opposite sides of the disc.

Figure 3:
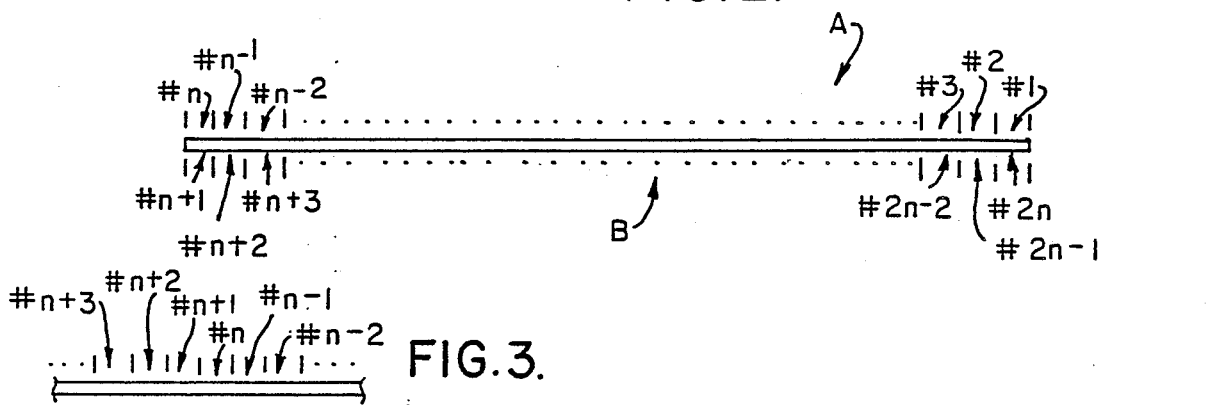
FIG. 3 is a view similar to FIG. 2 illustrating what the floppy disc of FIG. 2 looks like to the computer.

The present invention handles the transition between the 40th and 41st tracks (in either direction) in a transparent fashion so that to computer 15 the arrangement of tracks on the disc looks like that shown in FIG. 3 instead of FIG. 2. That is, to the computer, floppy disc 13 is just one large continuous surface. This is accomplished by switching from one surface to the other without any hesitation. That operation is completely transparent to the computer.

Figure 4:
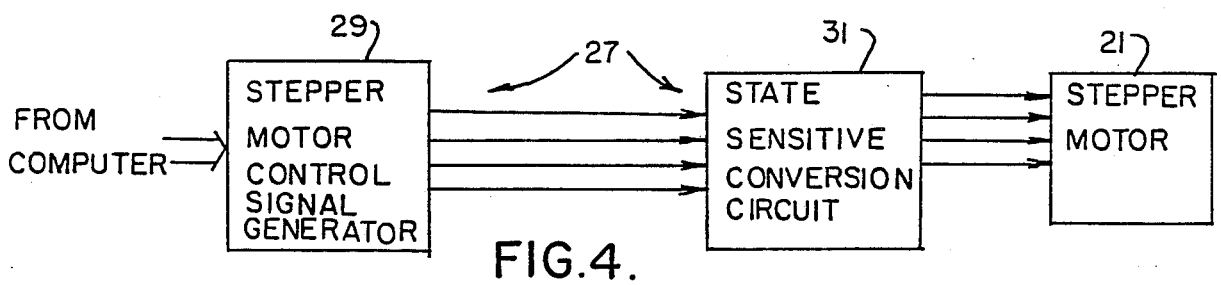
FIG. 4 is a block diagram of a portion of the drive control system of the present invention.

When the drive interface receives the commands from computer 15, it must translate those commands into a form recognizable by the drive system of the present invention. This is accomplished by a control circuit 27 (FIGS. 4, 7 and 8) which is part of drive interface 23. The control circuit includes a first circuit 29 for generating the stepper motor control signals. These signals, in the conventional manner, cause predetermined movement of heads 17 and 19. To move the heads in a desired direction with respect to the disc, predetermined sequences of control signals are supplied to the stepper motor. For example, for a given stepper motor a first predetermined sequence of stepper motor control signals causes the heads to move inwardly from the periphery of the disc and a second predetermined sequence of control signals causes the heads to move outwardly toward the periphery.

The stepper motor control signal generator provides outputs on four lines as required by stepper motor 21. These lines are inputs to a state sensitive conversion circuit 31 which is also part of control circuit 27.

Figure 5:
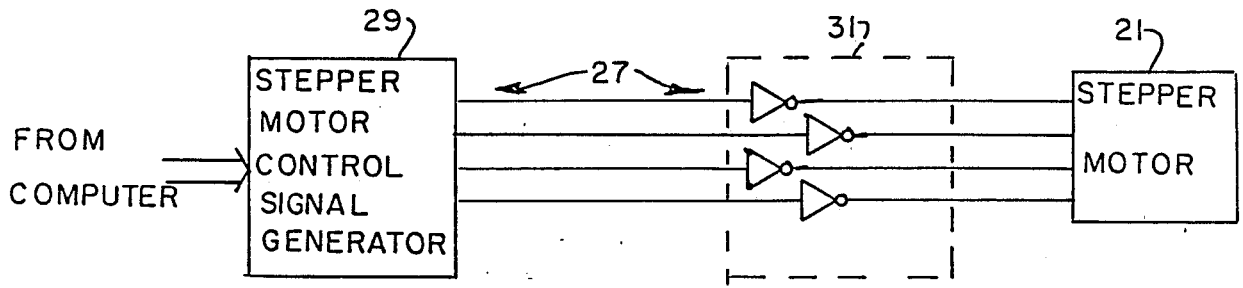
FIG. 5 is a view illustrating how the system of FIG. 4 operates when the first side of the disc is being read.

Control circuit 27 operates in two states. In the first state, the signals on the four lines from the control signal generator are applied directly (with a required inversion) to the corresponding four terminals of the stepper motor. This state is illustrated in FIG. 5.

In the second state, the signals on the four lines are not all applied to the corresponding terminals on the stepper motor. Instead (see FIG. 6) the signals on the top two lines are interchanged. This conversion or transformation of the signals has the effect of reversing the direction of motion of the stepper motor. For example, if the control signal generator generates a sequence of signals which would normally cause the stepper motor to move the heads outwardly toward the periphery of the disc, in state two these signals are transformed to cause the heads to move inwardly away from the periphery of the disc.

As will become apparent below, the control circuit switches from state one to state two when the computer requests a transition from track 40 to track 41 and switches back from state two to state one when a transition from track 41 to track 40 is requested. This allows the control signal generator to always generate the same sequence of control signals when movement to a higher track is requested even though the track might be on side A or on side B. For example, if head A is to be moved from track 39 to track 40 or from track 41 to track 42, control signal generator 29 generates the same sequence of control signals even though the first tracks are on side A and the second tracks are on side B.

The structure of the present drive system is best understood with reference to FIG. 7. The system, in addition to the elements heretofore mentioned, includes a monitor 33 for monitoring the request for a transition in either direction between track 40 and track 41. The monitor functions only when a selection switch 35 indicates that the disc is a high capacity type of the present invention. This switch is an input to a memory device 37 which stores this information and supplies it to activate or deactivate monitor 33.

Monitor 33 then controls conversion circuit 31 to allow the stepper motor control signals to pass through normally to the stepper motor when the system is in the first state or to reverse the direction of operation of the motor when the system is in the second state.

Memory 37 and the output of monitor 33 are also connected to a toggle 43 which activates the appropriate head as a switch is made from one side of the disc to the other. For example, when a transition is made from side A to side B, head 17 is deactivated and head 19 is activated.

Figure 8:
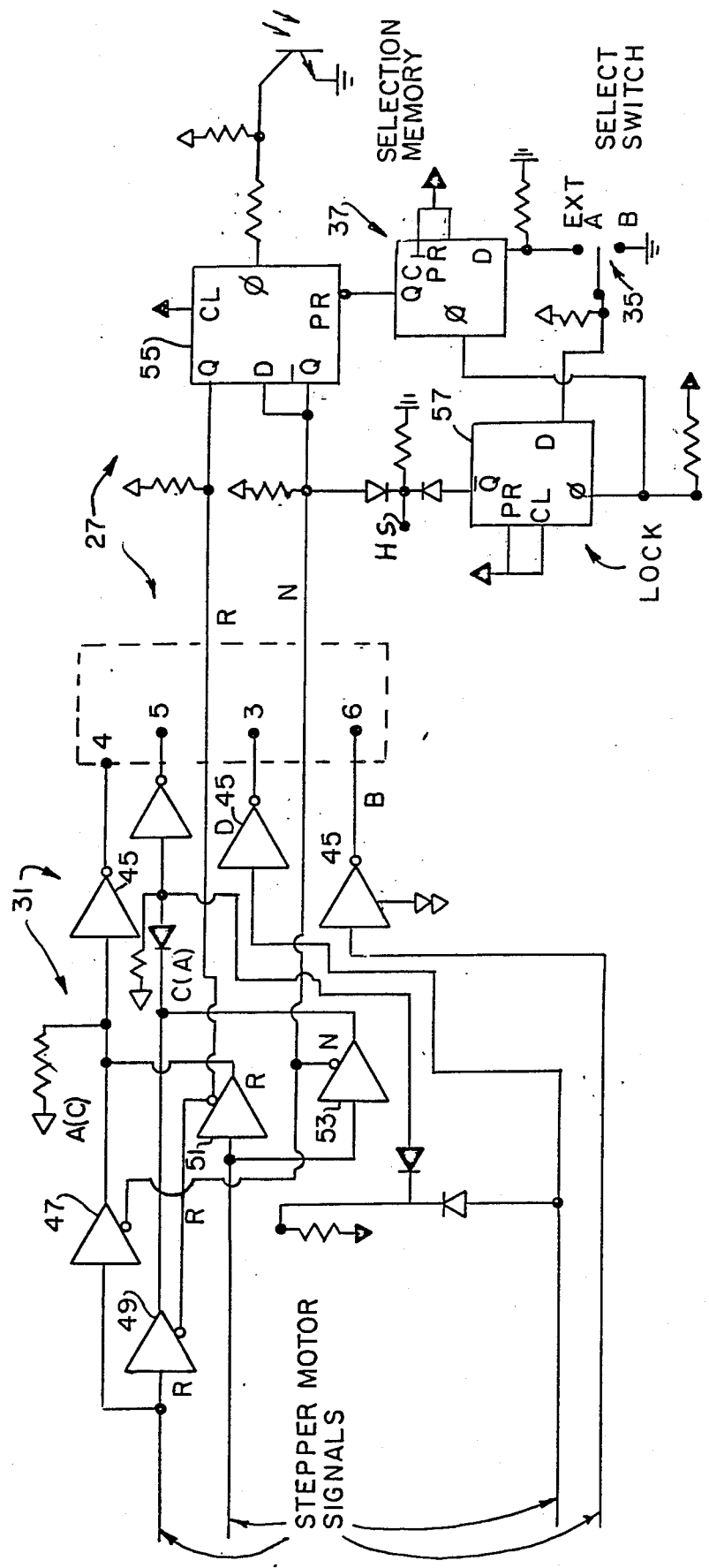
FIG. 8 is an electrical schematic of a portion of the drive system of FIG. 7.

A portion of the circuitry of FIG. 7 is illustrated in more detail in FIG. 8. Conversion circuit 31 includes a set of four inverters 45 which provide the outputs of the conversion circuit. Between the output inverters and the input to the conversion circuit (labelled stepper motor signals in FIG. 8) are four switchable buffers 47, 49, 51 and 53. Buffers 47 and 53 are "on" when the system is in state one and buffers 49 and 51 are off. On the other hand, buffers 49 and 51 are the only buffers "on" when the system is in state two.

Note that buffers 47 and 51 both have their outputs connected to the topmost inverter, while buffers 49 and 53 both have their outputs connected to the second topmost inverter. When the system is in state one, the topmost stepper motor control signal goes directly through buffer 47 to the topmost inverter 45. But when in state two, the topmost control signal instead goes through buffer 49 to the second topmost inverter 45. And the second topmost control signal undergoes a similar conversion when the system state is switched between state one and state two.

Activation of the various buffers to cause this conversion is accomplished by a D-type latch 55 under control of selection memory 37 (also shown as a D-type latch) and monitor 33. The Q and Q-bar outputs of latch 55 activate and deactivate the buffers to accomplish the result set forth above. By way of illustration, when the Q output of latch 55 is High and the Q-bar output is Low, conversion circuit 31 is in the first state (illustrated in FIG. 5).

Note that since the D-input of latch 55 is connected to the Q-bar output, the latch operates to divide-by-two. When the circuit is operating in the extended mode, as set by switch 35, the Q and Q-bar outputs of latch 55 flipflop at each clock pulse. These clock pulses are provided by the monitor and directly cause latch 55 to change state back and forth to drive the heads in the proper direction.

As the Q-bar output of latch 55 changes, it also changes the voltage on a terminal HS. The signal on terminal HS provides the read/write head select signal for toggle 43. For example, when the D-input to this latch is Low, head 17 (i.e., side A) is selected. Thus, the switching of conversion circuit 31 and the switching of the heads by terminal HS is accomplished at exactly the same time by operation of latch 55.

Note that a third latch 57 is provided whose Q-bar output is also connected to terminal HS. During the extended capacity operation of the system as described above, this Q-bar output is Low and hence the output of latch 55 controls the voltage on terminal HS. This Q-bar output of latch 57 is Low during extended capacity mode since the D-inputs to the selection memory and, more importantly, to latch 57 are High during that mode. When the "drive on" signal is received at the clock inputs to latch 57 and the selection memory, the Q-bar output of latch 57 goes Low and stays Low so long as the system is in the extended mode.

When the selection switch is in the "A" position, the D-input to latch 57 is still High and its Q-bar output Low. In this case, however, the D-input to the selection memory is Low and the Q output of the memory is also Low. This signal results in the Q output of latch 55 staying High and the Q-bar output of the latch staying Low. As a result, conversion circuit acts only like the circuit shown in FIG. 5 (first side operation only) and the voltage on terminal HS is held Low as well (since the Q-bar outputs of latches 55 and 57 are both Low).

When the selection switch is in the "B" position, the D-input of latch 57 is also Low, which causes its Q-bar output to be High. This High is supplied to terminal HS so that in mode B only the B side of the disc is read.

Operation of the present invention is best understood with reference to FIGS. 9A and 9B. During start-up, the system reads track "0" (not shown) to get the memory size of the disc and records this in memory. If the disc is not an extended capacity disc of the present invention, the system acts thereafter like a conventional disc drive system. If on the other hand, it is a disc like that shown in FIG. 2, the operations of FIG. 9B are performed when the computer requests a read/write operation.

The drive system first examines the block number of the read/write request and compares that with the size of the disc. If the request is for a position larger than could be present on the disc, the routine ends. On the other hand, if the request falls within the limits of the floppy disc, the drive motor is turned on and the drive seeks that requested block number.

This is done by advancing or retracting the heads as needed to reach the desired track. If during this process a transition is made from track 40 to track 41, or from track 41 to track 40, the heads are toggled and the conversion circuit is changed. For example, if the transition is from track 40 to track 41, head 17 is deactivated, head 19 is activated, and the state of the system is changed from state one to state two.

Similarly, if the transition is from track 41 to track 40, the reverse happens. Head 17 is activated, head 19 is deactivated, and the state of the system is changed from state two to state one.

Assuming no such transition, the system compares the requested position with the head position. This process continues until the requested position is reached at which point the read/write operation occurs. If this completes the command, the drive is turned off and the routine is exited. Otherwise, the system begins the process again by getting the block number for the next read/write operation.

From the above, it will be seen that at the threshold between track 40 and track 41, whether reading or writing, the drive system activates the circuitry to automatically switch read/write head sides and reverses the stepping sequence without interruption while the head is being positioned on to the next track. This enables the drive to store a portion of a file on one side and continue it on to the other without any disruption to the processing of the information contained within that file.

In view of the above, it will be seen that the several objects and features of this invention are achieved and other advantageous results obtained.

As various changes could be made in the above systems and methods without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A drive system for a floppy disc having numbered data tracks on both sides thereof, said data tracks being ordered in a predetermined sequence, said drive system comprising:
   a first head for transferring data between a personal computer or the like and one side of the floppy disc;
   a second head for transferring data between the personal computer and the second side of the floppy disc;
   a stepper motor responsive to stepper motor control signals for moving the first and second heads to predetermined tracks on the floppy disc, said stepper motor control signals determining the predetermined track to which the stepper motor moves the heads;
   a control circuit for generating the stepper motor control signals, said control circuit receiving signals from the computer in a predetermined standard format defining the action desired by the computer;
   the tracks on said floppy disc being disposed with the first "n" tracks on one side of the floppy disc and the "n+1"s track and remaining tracks on the other side of the floppy disc, said "n"th and "n+1"st tracks being disposed adjacent each other along a boundary of the disc but on opposite sides of the disc;
   said control circuit including means for generating a first predetermined sequence of stepper motor control signals when the computer requests movement from any one track to a higher track and for generating a second predetermined sequence of stepper motor control signals when the computer requests movement from any one track to a lower track;
   said control circuit further including transforming means responsive to a transition from the "n"th track to the "n+1"st track to accept the first predetermined sequence of stepper motor control signals and transform those signals into signals which cause movement of the stepper motor in the direction opposite that caused by the untransformed signals of the first predetermined sequence and to accept the second predetermined sequence of stepper motor control signals and transform those signals into signals which cause movement of the stepper motor in the direction opposite that caused by the untransformed signals of the second predetermined sequence.

2. The drive system as set forth in claim 1 wherein the transforming means includes means responsive to a transition from the "n+1"st track to the "n"th track to accept the first predetermined sequence of stepper motor control signals and apply those signals directly to the stepper motor and to accept the second predetermined sequence of stepper motor control signals and to apply those signals directly to the stepper motor.

3. The drive system as set forth in claim 2 wherein the transforming means includes latching means for latching the functioning thereof until a transition between the "n"th and the "n+1"st tracks.

4. The drive system as set forth in claim 1 wherein the control circuit includes means for monitoring the track to which the stepper motor has carried the heads and for signalling the transforming means when the personal computer requests movement of the heads between the "n"th and the "n+1"st, tracks.

5. The drive system as set forth in claim 4 wherein the control circuit further includes means responsive to the monitoring means for reversing the direction of travel of the stepper motor when the computer requests movement between the "n"th and the "n+1"st tracks.

6. The drive system as set forth in claim 4 further including means responsive to the monitoring means and operating transparently to the computer for switching from the first head to the second head when the computer requests movement from the "n"th track to the "n+1"st track and for switching from the second head to the first head when the computer requests movement from the "n+1"st track to the "n"th track.

7. The drive system as set forth in claim 1 wherein the drive system has a plurality of modes of operation, further including manually operable switch means for manually setting the mode of operation of the drive system.

* * * * *